(No Model.)

F. A. OLSON.
COMBINED PITCHFORK AND HAND RAKE.

No. 346,677. Patented Aug. 3, 1886.

Witnesses:
Wm. H. Rowe
H. M. Richards.

Inventor:
Frank A. Olson
By W. B. Richards,
Attorney.

UNITED STATES PATENT OFFICE.

FRANK A. OLSON, OF GALESBURG, ILLINOIS.

COMBINED PITCHFORK AND HAND-RAKE.

SPECIFICATION forming part of Letters Patent No. 346,677, dated August 3, 1886.

Application filed January 26, 1886. Serial No. 189,810. (No model.)

*To all whom it may concern:*

Be it known that I, FRANK A. OLSON, a citizen of the United States, residing at Galesburg, in the county of Knox and State of Illinois, have invented certain new and useful Improvements in Combined Pitchfork and Hand-Rake, of which the following is a specification.

This invention relates to a combined pitchfork and hand rake; and it consists in constructions and combinations hereinafter described and claimed.

Figure 1:
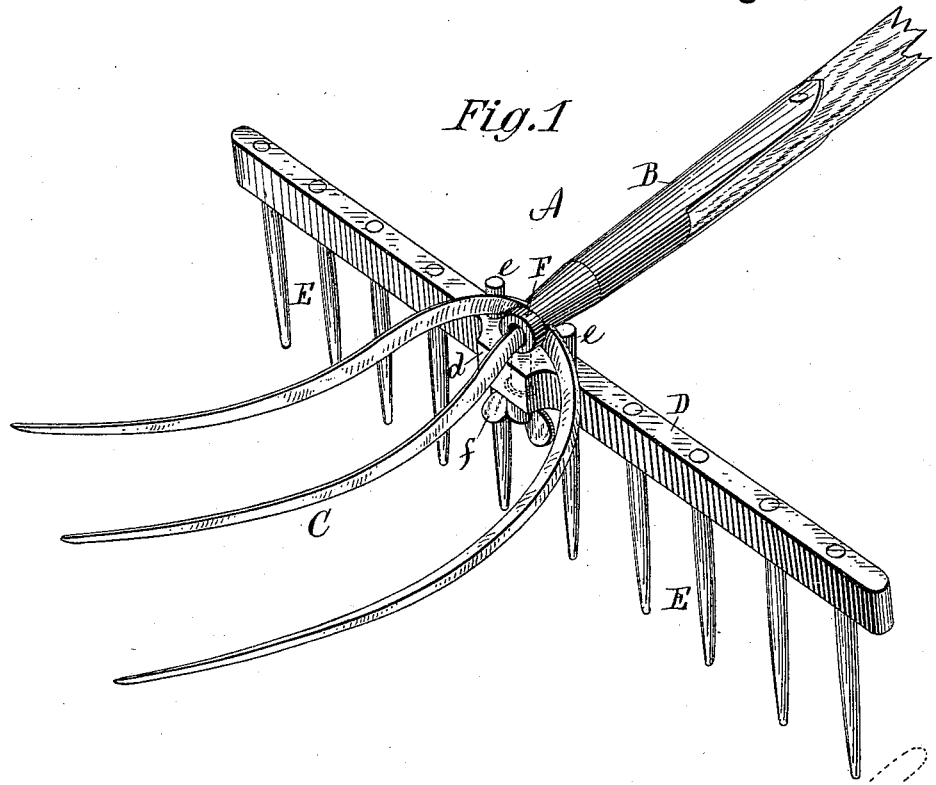
Figure 2:
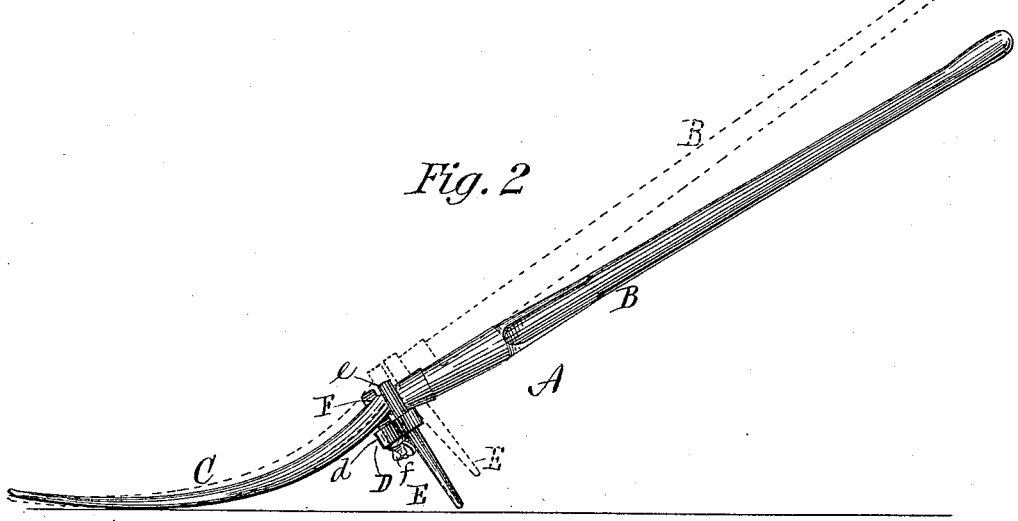

In the accompanying drawings, which illustrate my invention, Figure 1 is a perspective; Fig. 2, a side elevation.

Referring to the drawings by letters, the same letter indicating the same part in the different figures, A represents an ordinary pitchfork, of which B is the handle, and C the tines.

D is an ordinary hand-rake head, with ordinary teeth, E. The rear ends, *e*, of the two central teeth E extend a short distance through and project beyond the rake-head.

F is an eyebolt. The central tine, C, passes through the eye in the bolt F, and the shank of the eyebolt passes through the rake head D and is secured by a thumb-nut, *f*.

In securing the rake-head to the fork the fork is placed on the rake, as shown at Fig. 1, with one side of the outer fork-tines resting against the rear ends, *e*, of the central rake-teeth, and their opposite sides resting against the eye of the eyebolt F. By tightening the nut *f*, the fork and rake-head will be held firmly to each other, and the outer fork-tines resting, as shown, against the projections *e* on one of their sides and the eyebolt on their other sides will hold the same parts firmly against lateral displacement.

As shown in the drawings, the rake-head has an enlargement, *d*, where the eyebolt F passes through it; but this enlargement may be dispensed with and the eyebolt be otherwise secured to the rake head. Other projections may also be used instead of the projecting rear ends, *e*, of the teeth E. In fact, while I have shown and claim this one method of securing the rake-head and the fork to each other, it will be evident that other means of attachment may be used, and hence I do not limit my claims to these claims for the specific method shown; but I further claim the combination of rake-head and fork when secured to each other in or about in the relative positions shown, to adapt the combined rake and fork to the uses herein described. I do not, however, claim as my invention the well-known implement in which a head with teeth is hinged to a handle, and is convertible for use as a rake and as a fork; nor do I claim the well-known attachment of hoes to rakes in such manner that the hoe does not co-operate with the rake in any of its uses.

In raking hay, lawn-grass, weeds, or other similar material, it is frequently necessary to have a fork for moving parts or all of it, and in pitching hay or other material it is frequently convenient and necessary to have a rake to rake together or collect the scattering remnants, and in these and many other places where a rake and fork are used my invention will supply both the rake and fork, always at hand, and without having the two separate implements, one of which is generally at a distance while the other is in use, and hence not convenient when needed. In raking, the fork also becomes a guide or guard to regulate the depth of raking, which is a very useful feature, especially in raking lawns and other places where it is not desired to rake up old grass, clover, or other material, or where it is desired to regulate the depth of raking for any purpose. The manner in which the fork-tines rest on the ground, grass, or stubble to regulate the depth of raking will be plainly seen at Fig. 2, and the manner in which the depth of raking may be regulated by holding the handle B at different angles to the surface of the ground is also shown by dotted lines at same figure.

Having thus described my invention, what I claim as new, and desire to secure by Letters Patent, is—

1. In combination, substantially as described, a rake-head with teeth fixed to a pitchfork, for the purpose specified.

2. In combination, a rake-head with teeth fixed to a pitchfork by means of projecting teeth *e*, and an eyebolt, F, substantially as and for the purpose specified.

3. In combination, a pitchfork, a rake-head having teeth, two of which project to form guards *e*, and eyebolt F, substantially as and for the purpose specified.

In testimony whereof I affix my signature in presence of two witnesses.

FRANK A. OLSON.

Witnesses:
H. M. RICHARDS,
THOMAS MCKEE.